(12) United States Patent
Van Riet (10) Patent No.: US 9,780,566 B2
(45) Date of Patent: Oct. 3, 2017

(54) ELECTRICITY DISTRIBUTION SYSTEM, END USER RESIDENCE, AND METHOD

(71) Applicant: LIANDON B.V., Duiven (NL)

(72) Inventor: Martinus Johannes Maria Van Riet, Arnhem (NL)

(73) Assignee: Alliander N.V., Arnhem (NL)

( * ) Notice: Subject to any disclaimer, the term of this patent is extended or adjusted under 35 U.S.C. 154(b) by 0 days.

(21) Appl. No.: 14/738,569

(22) Filed: Jun. 12, 2015

(65) Prior Publication Data

US 2015/0280438 A1 Oct. 1, 2015

Related U.S. Application Data

(63) Continuation of application No. 12/995,755, filed as application No. PCT/NL2009/050302 on Jun. 2, 2009, now Pat. No. 9,088,161.

(30) Foreign Application Priority Data

Jun. 2, 2008 (NL) ...................................... 2001644

(51) Int. Cl.
  *H02J 3/34* (2006.01)
  *B64F 1/36* (2017.01)
  (Continued)

(52) U.S. Cl.
  CPC ................... *H02J 3/34* (2013.01); *B64F 1/36* (2013.01); *H02J 3/00* (2013.01); *H02J 4/00* (2013.01); *Y10T 307/492* (2015.04)

(58) Field of Classification Search
  CPC ........................... H02J 7/0055; Y10T 307/305
  (Continued)

(56) References Cited

U.S. PATENT DOCUMENTS 5,384,429 A * 1/1995 Bulson ............... H01B 11/1895
  174/102 R
6,545,880 B1 * 4/2003 Mueller .................... H02J 3/00
  174/43
(Continued)

FOREIGN PATENT DOCUMENTS

AU WO 2007000016 A1 * 1/2007 ......... B65H 75/4402
EP 1708348 A1 10/2006
(Continued)

OTHER PUBLICATIONS

Lohjala et al., "The Three Voltage Level Distribution SYstem Using the 1000 V Low Voltage System," 18th Annual International Conference on Electricity Distribution, Jun. 6-9, 2005, Turin.*
(Continued)

*Primary Examiner* — Rexford Barnie
*Assistant Examiner* — Joseph Inge
(74) *Attorney, Agent, or Firm* — Pillsbury Winthrop Shaw Pittman LLP (57) ABSTRACT

An electricity distribution system, arranged to provide low voltage to end users and located at end user locations, includes a first medium voltage line for providing medium voltage and several end user electricity providers associated with respective several end user locations. Each end user electricity provider is couplable to an end user located at the respective end user location, and is arranged to provide low voltage to the end user. The first medium voltage line is provided with a number of branches and the end user electricity providers are each couplable to a respective branch of the medium voltage line via a respective second medium voltage line to receive medium voltage, and are arranged to convert the medium voltage to the low voltage to be provided to an end user.

24 Claims, 4 Drawing Sheets

(51) Int. Cl.
   *H02J 3/00*     (2006.01)
   *H02J 4/00*     (2006.01)
(58) Field of Classification Search
   USPC .......................................................... 307/18
   See application file for complete search history.

(56) References Cited

U.S. PATENT DOCUMENTS

| | | | | |
|---|---|---|---|---|
| 2002/0041126 | A1* | 4/2002 | Provanzana | H02J 3/28 307/48 |
| 2003/0000788 | A1* | 1/2003 | Skowronski | H02G 11/02 191/12.2 R |
| 2003/0117025 | A1* | 6/2003 | Rouquette | G01V 1/201 307/147 |
| 2005/0040809 | A1* | 2/2005 | Uber, III | G01R 15/142 324/117 R |
| 2008/0062606 | A1* | 3/2008 | Brown | H02H 9/042 361/111 |

FOREIGN PATENT DOCUMENTS

| | | | |
|---|---|---|---|
| FR | 2897340 A1 | 2/2006 | |
| GB | 2231073 A | 11/1990 | |
| GB | 2428651 A | 2/2007 | |
| SE | GB 2231073 A  * | 11/1990 | ................ B64F 1/00 |
| WO | 01/97360 A1 | 12/2001 | |
| WO | 2007000016 A1 | 1/2007 | |
| WO | 2007/061622 A1 | 5/2007 | |

OTHER PUBLICATIONS

Lohjala et al.,"The Three Voltage Level Distribution System Using the 1000 V Low Voltage System," 18th Annual International Conference on Electricity Distribution, Jun. 6-9, 2005, Turin.*
International Search Report for PCT International Patent Application No. PCT/NL2009-050302, mailed Mar. 16, 2010.
Lohjala et al., The Three Voltage Level Distribution System Using the 1000 V Low Voltage System, 18th Annual International Conference on Electricity Distribution, Jun. 6-9, 2005, Turin.
Dutch Search report for Netherlands Patent Application No. 2001644, dated May 8, 2009.

* cited by examiner

ELECTRICITY DISTRIBUTION SYSTEM, END USER RESIDENCE, AND METHOD

CROSS REFERENCE TO RELATED APPLICATIONS

This application is a continuation of U.S. Ser. No. 12/995,755, filed Dec. 2, 2010, which is the U.S. National Phase application of International Application PCT/NL2009/050302, filed Jun. 2, 2009, which claims priority to Netherlands application 2001644, filed Jun. 2, 2008, the entire contents of each being incorporated herein by reference in their entireties.

FIELD

The invention relates to an electricity distribution system, arranged to provide low voltage to end users located at end user locations, for instance transport means.

BACKGROUND

Such a system is known per se from practice. A known system is, for instance, arranged to provide airplanes with electricity during stopovers at airports.

It is typically desired that, after landing, airplanes are ready to take off again as soon as possible. Therefore, the period during which the airplane stands still at a respective gate of the airport needs to be as short as possible.

Airplanes standing still during a stopover, whose main engines have been switched off, are to be provided with electricity to feed several electricity-consuming parts. Typically, to this end, each airplane is provided, in the tail, with an auxiliary generator with respective auxiliary turbine, which burns fuel (for instance kerosene). It has been found that the greater part of airplane-related $CO_2$ emission of an airport is caused by these airplane auxiliary generator/turbine systems. The auxiliary generators and turbines need to have a compact and lightweight design for use in airplanes, and are very inefficient (with efficiencies of maximally 15%).

When an airplane needs to stand still relatively long, usually an external diesel generator is connected to the airplane. Such external diesel generators are rather sizeable, inefficient (with a maximum efficiency of 20%), little user-friendly, make a lot of noise and are, moreover, particularly environmentally harmful.

WO2007/061622 describes an airplane support system with a mobile cart, arranged to convert a 3-phase 460 VAC (i.e. low voltage). The cart is provided with a diesel generator to generate the low voltage, and may alternatively be supplied with low voltage via a power cable.

Figure 1:
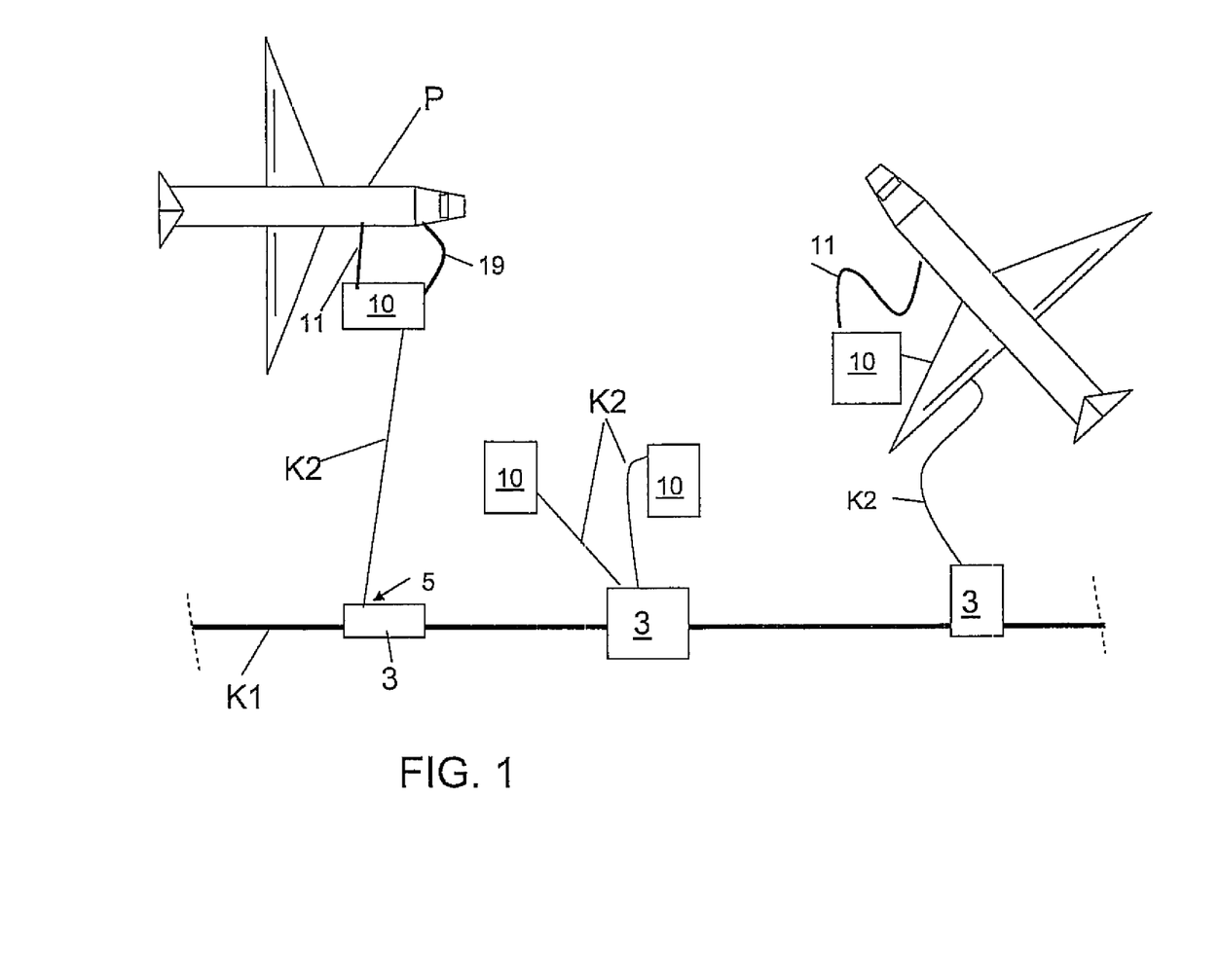
FIG. 1 schematically shows a system according to an exemplary embodiment of the invention.

WO01/97360 discloses a battery charging system. FIG. 1 of this document merely shows a circuit breaker CB1 and vehicle chargers provided with their own circuit breakers CB2, CB3. The present invention contemplates obviating above-mentioned drawbacks of known systems. In particular, the invention contemplates an entirely new electricity distribution system, with which electricity can be provided to end users, for instance transport means, in a particularly efficient and environmentally friendly manner.

SUMMARY

According to an aspect of the invention, to this end, the system comprises:

a first medium voltage line for providing medium voltage, wherein the first medium voltage line is provided with a number of branches; and several end user electricity providers associated with respective several end user locations, wherein each end user electricity provider is couplable to a said end user located (stored) at the respective end user location, and is arranged to provide low voltage to the end user.

It is then particularly advantageous when the end user electricity providers are each couplable to a respective branch of the medium voltage line via a respective second medium voltage line to receive medium voltage, and are arranged to convert the medium voltage to low voltage to be provided to an end user.

Also, according to an aspect of the invention, there is provided an electricity distribution system, arranged to provide low voltage to end users, located at end user locations, comprising:

a first medium voltage line for providing medium voltage, wherein the first medium voltage line is provided with a number of branches; and a plurality of end user electricity providers associated with a respective end user locations, wherein each end user electricity provider is couplable to an end user located at the respective end user location, and is arranged to provide low voltage to the end user;

wherein the end user electricity providers are each couplable to a respective branch of the first medium voltage line via a respective second medium voltage line to receive the medium voltage, and are arranged to convert the medium voltage to the low voltage to be provided to a respective end user, wherein the first and second medium voltage lines provide alternating current with a first frequency, wherein at least one of the end user electricity providers is arranged to provide an AC voltage with a second frequency to the respective end user, wherein the first frequency is lower than 100 Hz, wherein the second frequency is higher than 100 Hz.

Use of the invention can take medium voltage to near the end users (for instance airplanes, vessels, transport means, mobile fairground attraction apparatuses or other end users), in particular utilizing the end user electricity providers. In this manner, local $CO_2$ emission of, for instance, an airport (or other end user residence) can be reduced considerably (in some cases by as much as a factor of 10), in that activation of auxiliary generators of end users during stationary end user condition can be avoided. Further, losses can be minimized, in particular when a large number of end user locations are served (as when used at an airport), particularly compared to the known systems which use only low voltage.

To date, no one has conceived the idea of locally using medium voltage (instead of diesel generators or low voltage), probably because of fear of electrocution, risk of sparks, for instance near airplanes. The present invention overcomes this prejudice. According to an extra advantageous elaboration, each above-mentioned branch is provided with a safety device, in particular a high-voltage fuse, for the protection of a second medium voltage line coupled thereto. Preferably, each branch (in particular a respective second medium voltage line) is provided with a grounded shield. Thus, it is found that a surprisingly safe system is obtained, where risk of electrocution due to accidental cutting of a second medium voltage line is prevented. Thus, upon cutting of a second medium voltage line, first the grounded shield is touched, and only then a well protected, voltage-carrying medium voltage conductor of this line, which has been found to provide a high degree of safety (this has been established experimentally).

Also, an aspect of the invention provides an electricity distribution system, arranged to provide low voltage to end users, located at end user locations, the system comprising:
- a first medium voltage line for providing medium voltage, wherein the first medium voltage line is provided with a number of branches; and
- a plurality of end user electricity providers associated with a respective end user locations, wherein each end user electricity provider is couplable to a end user located at the respective end user location, and is arranged to provide low voltage to the end user;

wherein the end user electricity providers are each couplable to a respective branch of the first medium voltage line via a respective second medium voltage line to receive the medium voltage, and are arranged to convert the medium voltage to the low voltage to be provided to a respective end user, wherein the system includes a number of branch stations providing the number of branches, wherein at least one of the branches is provided with one or more manually operable detachable couplings, to couple one or more second medium voltage lines to the first medium voltage line.

The invention further offers a method that includes a use of the system according to the invention.

According to an aspect of the invention there is provided a method to provide low voltage to at least one end user using at least one respective end user electricity provider, wherein the end user is coupled to the at least one respective end user electricity provider, the method comprising the at least one respective end user electricity provider receiving medium voltage, converting the medium voltage to low voltage, and providing the low voltage to the at least one end user, wherein both the medium voltage and low voltage comprise AC voltage, and wherein a frequency of the low voltage is higher than a frequency of the medium voltage.

In an advantageous manner, the method comprises a particularly environmentally friendly and user-friendly method of providing low voltage to end users located in a residence, for instance movable end users, transport means, airplanes or vessels. An end user is coupled to a respective end user electricity provider, while the end user electricity provider receives medium voltage and converts it to the above-mentioned low voltage. According to a further elaboration, each end user and respective end user electricity provider may, for instance, be moved towards each other from a position away from each other in order to be intercoupled. According to a non-limiting example, in the position moved towards each other, end user and respective end user electricity provider may be at a relatively short distance from each other, for instance a distance of less than 100 m, preferably shorter than 25 m and more in particular shorter than 10 m.

The end user is in particular movable from and to an above-mentioned end user location.

It is further advantageous when each end user electricity provider is movable individually. This provider may, for instance, be provided with a windable and unwindable medium voltage cable, to be coupled to a main medium voltage line. At least one (and preferably each) of the end user electricity providers may, for instance, unwind a medium voltage line during movement towards an end user located at an end user location, and wind the medium voltage line during movement away from the end user.

Also, an aspect of the invention provides a method to provide low voltage to at least one end user using at least one respective end user electricity provider, wherein the end user is located at an end user location, wherein the end user is coupled to the at least one respective end user electricity provider, the method comprising the at least one respective end user electricity provider receiving medium voltage, converting the medium voltage to low voltage, and providing the low voltage to the at least one end user, the method including: providing a first medium voltage line for providing the medium voltage, wherein the first medium voltage line is connected to a number of branch stations, the branch stations providing a number of branches, wherein at least one of the branch stations is provided with one or more manually operable detachable couplings, to couple one or more second medium voltage lines to the respective branch station;

wherein a second medium voltage line is manually coupled to a respective branch station for providing the medium voltage to a respective end user electricity provider.

Further elaborations are described in the subclaims.

BRIEF DESCRIPTION OF THE DRAWINGS

The invention will now be explained on the basis of an exemplary embodiment and with reference to the drawing, in which.

DETAILED DESCRIPTION

In this application, like or corresponding features are designated by like or corresponding reference characters.

FIG. 1 schematically shows an example of an end user residence (in this case a transport means residence), provided with several (for instance predetermined) end user locations to store several end users, in this case transport means P. These end user locations may be mutually physically separated locations, and/or comprise docks, landing stages (for boats), transport means support platforms, locations on a parking lot or in a conference hall, or the like, and may have varying positions or, conversely, specific predetermined positions. Preferably, the end user locations are provided with specific markings (not shown), to indicate where each end user location is located. Further, different end user locations may be near one another, and/or at a relatively large distance from one another. At an airport, for instance, different platforms located at a distance from one another may be provided to store airplanes P, while each platform provides several locations to receive several airplanes.

The example shown in FIG. 1 particularly comprises a part of an airport, where airplanes P are located. The airport is provided with an exemplary embodiment of an electricity distribution system K1, 3, K2, 10 to provide low voltage to the airplane P stored in the residence, at least at the above-mentioned end user locations. Only a part of the system K1, 3, K2, 10 is shown in the Figure.

The above-mentioned low voltage to be provided to the transport means P is preferably a voltage lower than 1 kV, in particular a voltage in the range of 100-500 V.

The end users (in this example: airplanes) P, for instance, stand still when they have been coupled to the electricity distribution system, for instance during a stopover at the airport. Each airplane P may be uncoupled from the electricity distribution system for the purpose of leaving (e.g. taxiing to a runway and taking off), the airplane leaving the respective (for instance predetermined) end user location.

The electricity distribution system K1, 3, K2, 10 is particularly arranged to provide low voltage to end users (in this case transport means) P located stationarily at end user locations, and comprises one or more first medium voltage lines K1 (in this case only one) for providing medium voltage.

The first medium voltage line K1 is preferably laid at least partly underground, for instance at the locations of branches 3. This line K1 may, for instance, be coupled to an electricity provider (not shown) (for instance a power station). Coupling between the medium voltage line K1 and electricity provider for the purpose of providing current to this line K1 may be carried out in different manners, for instance via a high-voltage grid, distribution stations and the like (not shown), which will be readily apparent to a skilled person.

Preferably, each first medium voltage line K1 is in itself a multi-phase line K1, for instance a three-phase line which operatively provides three different phases of electricity ("power current"). Such line K1 are known per se from practice, and may, for instance, comprise a power cable, which is provided with different conductors l1, l2, l3 to conduct the different current phases (see FIG. 3). The conductors l1, l2, l3 are preferably surrounded by a suitable (optionally steel wire-reinforced) safety sheath, which sheath may, for instance, also comprise a grounding shield (surrounding the conductors). The conductors l1, l2, l3 are electrically insulated from one another (by means of a suitable insulating material). In addition, the medium voltage line K1 may, for instance, be provided with one or more neutral conductors, for instance a common neutral line N (e.g. a neutral conductor N surrounded by the safety sheath, which also serves as a grounding shield). This grounding shield may, for instance, be a closed metal (for instance lead) pipe under the safety sheath, or may consist of many thin parallel conductors (for instance copper conductors) under this same safety sheath, or may be designed in a different manner.

Preferably, the first medium voltage line K1 operatively provides a voltage in the range of 1-50 kV, in particular 1-25 kV, more in particular 5-15 kV. This medium voltage is particularly an AC voltage and has, for instance, a (first) frequency of less than 100 Hz, for instance 50 Hz or 60 Hz. In case the medium voltage is provided via several conductors l1, l2, l3, as in this exemplary embodiment, the above-mentioned medium voltage is a voltage between any two voltage-carrying conductors l1, l2, l3. In that case, the voltage per conductor can be determined in the known manner: with the three-phase current (with three conductors l1, l2, l3 to present the three-phase medium voltage), the voltage between each conductor and ground (i.e. the neutral conductor N) is the $1/\sqrt{3}$ (square root of three) value of the total voltage (between any two conductors). So, in that case, the medium voltage per conductor l1, l2, l3 is lower than the total voltage provided by the first medium voltage line K1.

Figure 3:
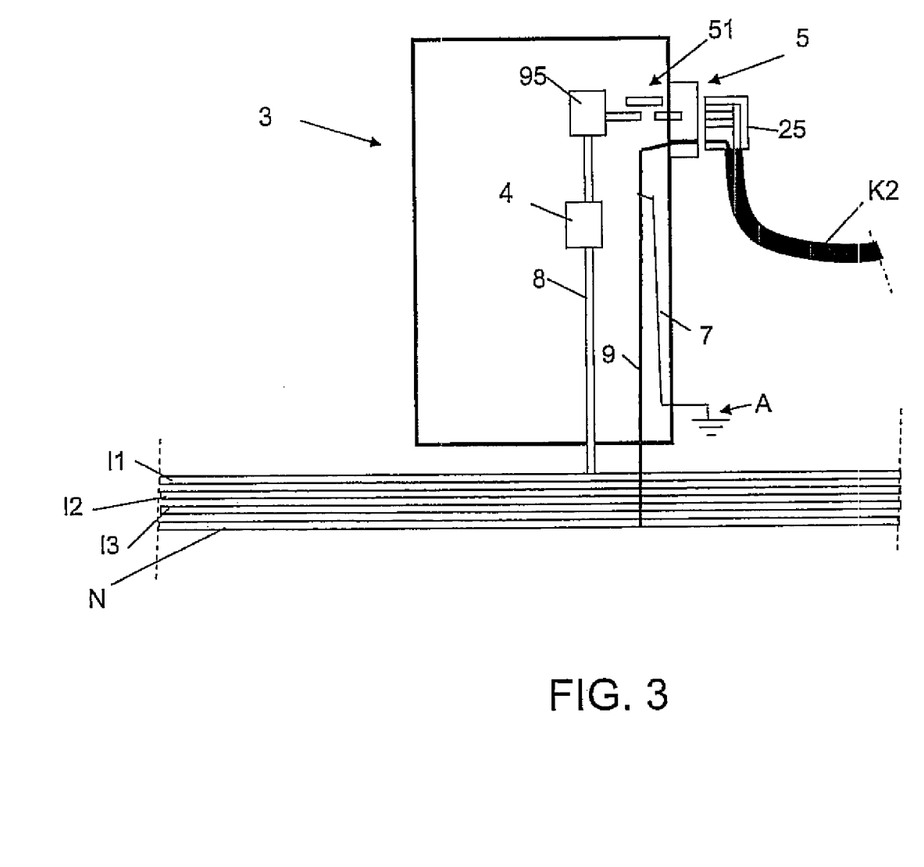
FIG. 3 schematically shows a branch station of the system shown in FIG. 1.
Figure 4:
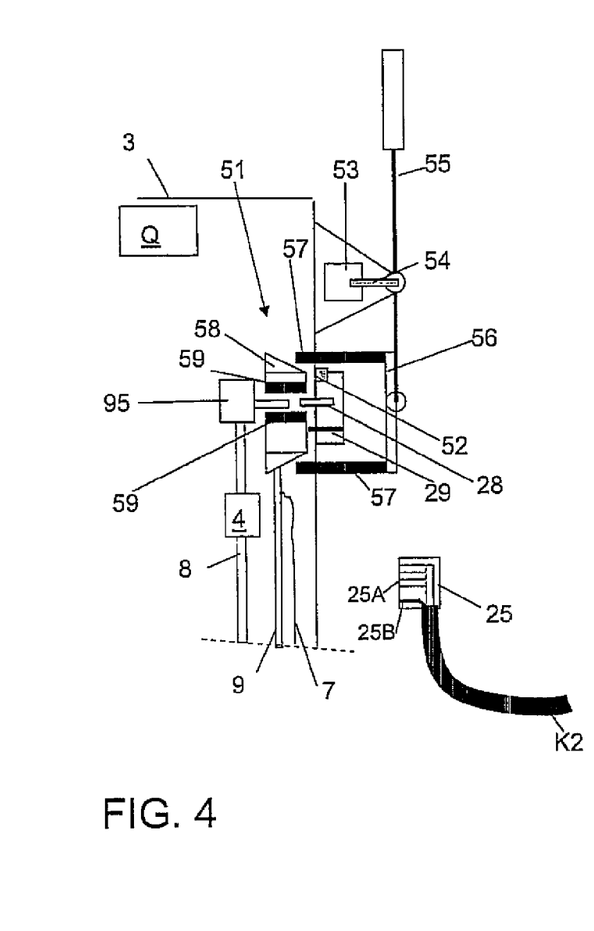
FIG. 4 shows an example of a medium voltage coupling of the station shown in FIG. 3, in an uncoupled condition.
Figure 5:
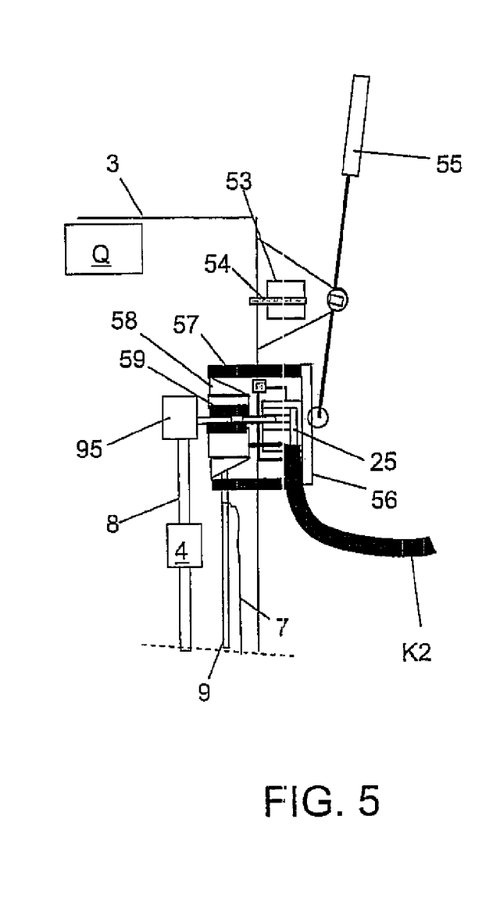
FIG. 5 shows the medium voltage coupling in a coupled condition.

The first medium voltage line K1 comprises a number of branches 3. Each branch may be designed in different manners. FIGS. 3-5 show examples of a local branch station 3 to provide such a branch (see below).

As FIG. 1 further shows, the system is, for instance, provided with several local end user electricity providers 10 associated with respective end user locations. In this case, one local electricity provider 10 is provided per end user location. Optionally, several electricity providers 10 may be provided per end user location. Further, for instance, one local electricity provider 10 may be arranged to provide low voltage to several end user locations. Each end user electricity provider 10 may, for instance, be arranged to provide powers in a range of approximately 50 to 800 kW, or in a different range.

According to a further elaboration, each branch 3 of the first medium voltage line K1 branches only one of the above-mentioned phases to a respective second medium voltage line K2. The second medium voltage line K2 is therefore preferably a single-phase electricity line.

Each above-mentioned second medium voltage line K2 may, for instance, comprise a cable, preferably a coax cable. Preferably, the cable K2 is at least partly movable relative to the branch 3. The cable K2 may be provided with only one line operatively carrying medium voltage, for instance a central conductor of the coax cable. The coax cable K2 may further be provided with a respective neutral conductor which is electrically insulated from the voltage-carrying conductor, in a conventional manner.

In particular, the neutral conductor of the coax cable K2 is a part of a sheath of the coax cable, which part is electrically insulated from the central conductor of this cable K2. Preferably, this neutral conductor consists in itself of a large number of conductors, for instance at least 50 neutral conductors (for instance thin copper wires), which are provided in the sheath of the cable K2. The sheath of the coax cable K2 preferably comprises a suitable safety sheath, which is arranged to prevent mechanical damage of the cable K2.

Each above-mentioned second medium voltage line (or cable) K2 may have a relatively short design compared to a total length of the first medium voltage line. A length of this first medium voltage line K1 may, for instance, be kilometers. A maximum length of a second medium voltage line K2 may, for instance, be shorter than 1 km, in particular shorter than 200 m. In particular, each second medium voltage line has a length in the range of 10-200 m, in particular 10-100 m.

Each end user electricity provider 10 may be couplable to a respective branch 3 of the medium voltage line K1 via a respective second medium voltage line K2 to receive medium voltage (in particular only one phase thereof). Further, each end user electricity provider 10 may be arranged to convert the medium voltage received via line K2 to the low voltage to be provided to a transport means P.

The electricity providers 10 are each couplable to an end user (in this case: airplane) P located at the respective end user location (see also the example in FIG. 2), to provide the end user P with electricity (in particular the above-mentioned low voltage) in an intercoupled condition.

According to a further elaboration, the end user electricity provider 10 is further arranged to couple the end user P to an electricity neutral conductor, which neutral conductor is provided via the above-mentioned second medium voltage line K2 and is operatively coupled to an above-mentioned neutral conductor N of the first medium voltage line K1.

In addition, the end user electricity provider 10 may be arranged to couple the end user P to a separate, local ground line A (see FIG. 3); in this example, such a ground connection may be brought about via a branch station 3, in particular via the neutral conductor of the second medium voltage line K2.

End User Electricity Provider

Figure 2:
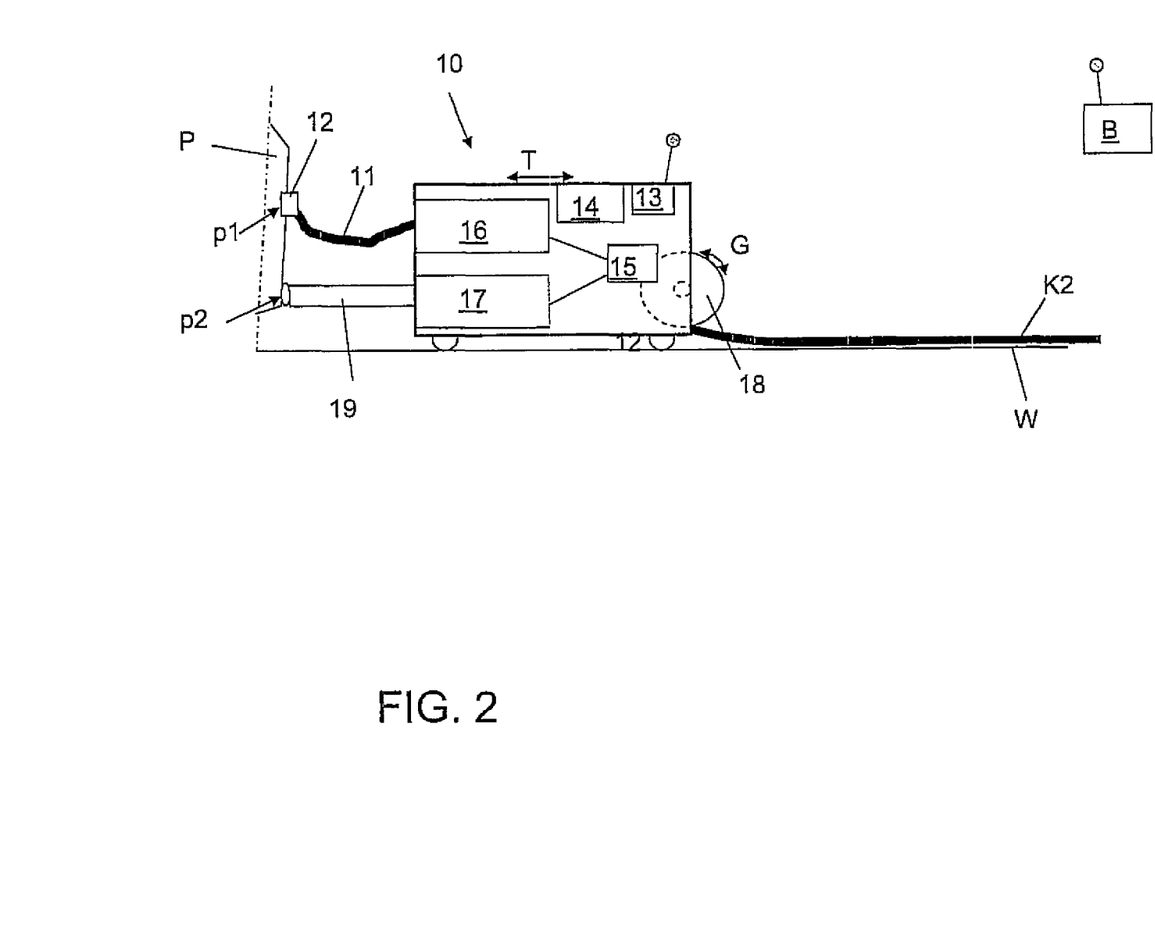
FIG. 2 schematically shows an end user electricity provider of the system shown in FIG. 1.

A non-limiting example of a local electricity provider 10 ("low voltage station") is shown in FIG. 2.

The electricity provider 10 as such may, for instance, comprise an electronic control unit 14, which may, for instance, be provided with suitable hardware, software, a computer, processor, memory, user interface (e.g. with display, keyboard, control buttons and/or the like), which will be readily apparent to a skilled person. The control unit 14 may be configured to regulate, control, etc. various tasks of the electricity provider 10.

According to a particularly advantageous elaboration, the end user electricity provider 10 is disposed movably relative to (for instance along or over) a respective end user location. An arrow T in FIG. 2 indicates such a movement. Then, it is further advantageous when the end user electricity provider 10 is automatically movable, in particular under the influence of a drive arranged to this end.

The movable end user electricity provider 10 may, for instance, comprise a frame, a watertightly sealable housing and/or the like, to which/in which various parts of the provider 10 are mounted.

Movement of the local provider 10 may be carried out in various manners. Thus, the provider 10 may, for instance, be disposed movably along guide means, for instance rails or the like (not shown). In addition, the provider 10 may, for instance, be provided with one or more motor-drivable wheels to move the provider 10 over a ground surface W.

Optional remote control of the provider 10 may, for instance, be carried out by means of a centrally disposed control unit B, which transmits control signals to the provider 10 to make the provider 10 carry out a particular action, for instance a desired movement. Transmission of control signals—between the end user electricity provider 10 on the one side and, for instance, a control unit B located at a distance therefrom—may be carried out via suitable communication means 13, for instance with transmitter and receiver means (optionally wireless, or with the aid of communication via a voltage-carrying conductor, with the aid of Power Line Carrier). According to a further elaboration, remote control of the provider 10 may be carried out utilizing the second medium voltage line as a control signal transmitting means. In addition, the control unit B may comprise a remote control which can be carried manually (by just one person).

A preferred embodiment comprises a movable end user electricity provider 10, which is couplable to an above-mentioned branch 3 by means of a flexible, preferably windable and unwindable power cable serving as a second medium voltage line K2 (i.e. K2). The second medium voltage line K2 is preferably an above-mentioned coax cable. In the example, the end user electricity provider 10 is provided with a pulley 18 rotatable by a drive, for automatically winding and unwinding the power cable K2 during movement of the electricity provider. An arrow G in FIG. 2 indicates winding/unwinding of the power cable K2.

The end user electricity provider 10 is designed to convert the medium voltage supplied via the second medium voltage line (cable) K2 to an above-mentioned low voltage suitable for the transport means P. To this end, the provider 10 is provided with a suitable voltage converter 15, for instance comprising a transformer, voltage converter electronics and/or the like.

As said, the first and second medium voltage lines K1, K2 preferably provide alternating current with a first frequency. Preferably, the end user electricity provider 10 is arranged to provide electricity (to an end user), which electricity has a frequency which is usable by a respective end user P.

An end user electricity provider 10 may be designed to provide voltages with different predetermined frequencies, if different end users P to be coupled need to receive voltages with such different frequencies.

The end user electricity provider 10 may, for instance, be arranged to generate from the alternating current a low voltage with a second frequency, and to provide this low voltage to a transport means P, while the second frequency is a predetermined frequency which can be used by the end user.

According to a further elaboration, the second frequency differs from the first frequency. The voltage converter 15 may, for instance, be integrally provided with or coupled to one or more frequency converters (i.e. frequency transformers, frequency regulators) 16 known per se, to bring about the desired frequency adjustment. In particular for use in combination with airplanes, it is advantageous if the second frequency is higher than the first frequency. The second frequency (of the low voltage to be provided to the transport means P) may, for instance, be higher than 100 Hz, for instance be in the range of approximately 200-500 Hz, and be, for instance, approximately 400 Hz. As already follows from the above, such a second frequency particularly depends on the frequency that can be processed by an end user P to be coupled.

According to a further elaboration, the end user electricity provider 10 may, for instance, be provided with a rectifier to convert the low voltage provided by the voltage converter 15 to a direct current. Such a rectifier may, for instance, be part of the voltage converter 15 (and may, for instance, be coupled downstream to an above-mentioned transformer of the voltage converter 15).

According to a further elaboration, an above-mentioned optional frequency converter 16 may, for instance, be arranged to convert an above-mentioned DC voltage (provided by an optional rectifier) to AC voltage.

The provider 10 may, for instance, be provided with one or more (optionally detachable) connecting cables 11, each provided with a coupling part 12 which is detachably connectable to a voltage input of the transport means P. The provider 10 may comprise storage means, for instance a reel, storage cabinet or the like, to store the connecting cable 11, when the cable 11 is not in use. The connecting cable 11 is coupled to an output of an above-mentioned voltage converter 15, or of an optional transformer 16, to provide the voltage provided thereby during use to transport means P.

Further, the connecting cable 11 may couple an above-mentioned neutral conductor to the transport means P. The provider 10 (electrically) couples this neutral conductor to a neutral conductor provided by the second medium voltage line (via an electrical connection which is not shown).

Above-mentioned coupling part 12 and voltage input p1 may be designed in various manners, for instance comprising grounded plug means or the like. Further, the system may be provided with adapters which are suitable and intended for coupling the power cable 11 to different types of voltage inputs p1 of different transport means P.

The coupling part 12 may further, for instance, be provided with one or more control buttons, which may, for instance, be arranged to switch voltage on the power cable 11 on and off. The coupling part 12 may further, for instance, be provided with one or more indicating means to indicate whether the power cable 11 carries voltage, and/or to indicate how high the voltage is (and optionally, which frequency the AC voltage has).

A low voltage provided by the end user electricity provider 10 may further be used to provide various parts of the end user electricity provider with electricity. Further, the provider 10 may be designed to generate different low voltages (from the medium voltage supplied), for instance a first low voltage for the benefit of a transport means P coupled to the provider 10, and one or more second low voltages for 'private use'. A latter low voltage (for 'private use') may, for instance, comprise direct current (DC).

The end user electricity provider 10 may, for instance, be provided with one or more rechargeable batteries, to store electricity; these batteries are preferably rechargeable utilizing an above-mentioned (first or second) low voltage provided by the provider 10 itself.

In this example, the end user electricity provider 10 is further, in an advantageous manner, provided with a cooling and/or heating device 17, which device 17 is arranged to provide a thermally conditioned cooling and/or heating medium to a transport means P. According to a further elaboration, this medium is air.

The cooling and/or heating device 17 is preferably fed by a low voltage provided by provider 10 itself. This device 17 may be designed in various manners, for instance with a cooling circuit, compressor, condenser, coolant pump and/or the like.

The end user electricity provider may be provided with an (optionally detachable) connecting hose 19 to supply the medium cooled and/or heated (at least, thermally conditioned) by the cooling and/or heating device, respectively, to the transport means P. The transport means P may be provided with a specific medium connecting point p2, which is in fluid communication with a cooling and/or heating circuit of the transport means P, to connect the hose 19 (or a suitable connecting head of the hose 19) thereto.

Alternatively, the hose 19 may, for instance, be fed into the end user via a passenger entrance, to blow thermally conditioned air directly into the end user P. Alternatively, the return air may be fed back via another hose (not shown).

Branch

An above-mentioned branch 3 of the system may be designed in various manners. A branch of the present system is designed in each case to branch a single phase from the medium voltage, via a second medium voltage line K2 connected to the branch 3. Different branches 3 (see FIG. 1) may be arranged to branch mutually different phases from the first line K1; however, such different branches do not need to be adjacent branches 3.

In addition, the branch may couple a neutral conductor of the second medium voltage line K2 (in particular a neutral conductor sheath part of this cable K2) to a neutral conductor N of the first line K1. Further, it is preferred if the branch locally electrically couples the neutral conductor of the second cable K2 to ground (for instance a ground obtained locally near the branch, for instance via a ground connection A provided in the soil or via a ground conductor separately installed at the same time, for instance a PEN conductor). Thus, this neutral conductor of the medium voltage cable K2 is (operatively) grounded, which provides the system with a high degree of safety.

As FIGS. 4-5 show, an above-mentioned branch 3 of the system may, for instance, be provided with one or more manually operable detachable couplings 5, to couple one or more second medium voltage lines K2 to the first medium voltage line K1.

Alternatively, an above-mentioned branch 3 of the system and a second medium voltage line K2 may, for instance, be interconnected by means of a non-detachable coupling.

Further, an above-mentioned branch 3 may be provided with one or more safety devices, in particular a high-voltage fuse 4, for the protection of a second medium voltage line K2 coupled thereto.

As FIG. 3 schematically shows, a branch may, for instance, comprise a (preferably closable) branch station 3, which is disposed near the first medium voltage line K1; a part of the first medium voltage line K1 may, for instance, be fed through the station 3.

The branch particularly comprises a first branch line 8, provided with an output 28, coupled to a conductor 11 of the first medium voltage line K1. Preferably, the branch also comprises a second branch line 9, which is coupled to a neutral conductor N of the first medium voltage line K1. The second branch line 9 comprises an output 29. The electrical connection between each branch line 9, 10 and the respective transport conductors 11, N of the first medium voltage line K1 may be designed in various manners known per se to a skilled person.

Further, a separate local ground connection A is provided, which, in this case, is locally provided near the branch station 3. A connection 7 locally electroconductively connects the ground connection A to the neutral conductor, via the second branch line 9, so that the neutral conductor is grounded.

In the example, the above-mentioned high-voltage fuse 4 is provided in the first branch line 8. The high-voltage fuse 4 may be arranged to interrupt the first branch line 8 if a short-circuit current runs through it, for instance a short-circuit current having a value of approximately 5 times the nominal value of a current carried through this line 8, in particular when the current carried through the fuse exceeds a particular threshold value (for instance 5×100 Ampere, in particular 5×80 Ampere, or a different value). Use of such a high-voltage fuse 4 results in a particularly safe and reliable branch; moreover, such a fuse is in itself relatively inexpensive.

The above-mentioned detachable coupling 5 may be designed in various manners and may comprise, for instance, coupling sleeves, coupling plugs, plug means and/or the like. FIG. 4 shows a condition in which the second medium voltage line (i.e. the flexible extension cable) K2 has come off the coupling 5, and FIG. 3 shows a coupled position.

Preferably, the configuration of the branch 3 is such that the second medium voltage line K2 only receives medium voltage if the medium voltage line K2 is locked to the branch station. This may be achieved in various manners.

The present system comprises, for instance, a circuit breaker 51 which interrupts an electrical connection between the first branch line 8 and an output 28 of the branch station 3 if no medium voltage line K2 is coupled to the branch station (see FIG. 4).

The first branch line 8 may, for instance, be provided with a power-cutout switch 95, which is arranged to allow an electrical connection in this first branch line 8 only after it has been determined that the second medium voltage line K2 is coupled to the branch station in a desired (safe) manner (see FIG. 4). In the example, the power-cutout switch 95 is disposed behind (i.e. downstream with respect to) the fuse 4. Preferably, a detector 52 is provided to control the power-cutout switch 95.

The configuration is preferably such that the power-cutout switch 95 closes the first branch line 8 only after it has been determined that the circuit breaker 51 is closed completely. The power-cutout switch can be controlled to automatically interrupt the first branch line 8 as soon as the circuit breaker 51 is or has been opened. In this manner, it can be achieved that the circuit breaker 51 as such is not carrying voltage during coupling and uncoupling of a second medium voltage line K2.

The circuit breaker 51 may electrically interconnect the first branch line 8 and the output 28 of the branch station 3 if the second medium voltage line K2 is indeed coupled to the branch station (see FIG. 5).

The circuit breaker 51 may be designed in various manners. In this example, the circuit breaker 51 as such has a substantially mechanical design, and comprises a movable electrically conductive bridge 59 to bridge an interruption in the branch line 8. FIG. 4 shows a first position in which the bridge 59 is moved away from the interruption in the branch line 8, such that no medium voltage is available at the output 28. FIG. 4 shows a second position in which the bridge 59 makes electrical contact with the branch line 8 to bridge the interruption, such that the medium voltage is available at the output 28.

In this example, the operation of the circuit breaker depends, in addition, on a medium voltage line locking system. The configuration is such that, if the second medium voltage line K2 is coupled to the branch station 3 in a predetermined manner safe for bystanders, the circuit breaker 51 can be operated to enable provision of medium voltage to the second medium voltage line K2 (via the output 28). In case the second medium voltage line K2 is not coupled to the branch station 3 in a particular manner, the circuit breaker automatically brings about interruption of voltage supply to the medium voltage output 28.

The second medium voltage line K2 comprises, for instance, a coupling piece 25 which can cooperate with the detachable coupling 5. The coupling piece 25 is, for instance, provided with a first connector part 25A to receive the medium voltage from the respective output 28 of the branch station 3, when the coupling piece 25 is retained by the coupling 5 (i.e. in the coupled position, as in FIG. 5).

The present coupling piece 25 comprises a second connector part (neutral conductor coupling part) 25B to make electrical contact with the output 29 of the second branch (neutral) line 9.

Preferably, the configuration of coupling piece 25 and coupling 5 (comprising outputs 28, 29) is such that, during coupling, first, electrical contact is made between the grounded neutral conductor parts 25B and only then between an above-mentioned first connector part 24A and voltage output 28.

The detachable coupling 5 may be provided with a locking system 55, 56 to lock the coupling piece 25 to the branch station 3, if the coupling piece 25 is in the coupled position. In this example, the locking system comprises a retaining body 56 (for instance a housing or frame) which is movable (relative to the station 3), which can engage the coupling piece 25 (in this case a side of the coupling piece 25 remote from the output 28) and can keep it in the position coupled to the coupling 5. In this example, a handle 55 coupled pivotally to the branch station 3 is provided, which is coupled to the retaining body 56 via a pivot in order to move this body 56. Means of changing a position of the retaining body 56 may also be designed in a different manner. In this example, the locking system 55, 56 is also arranged to operate the circuit breaker 51, depending on coupling of the coupling piece 25.

In a non-limiting example, the coupling (output) 5 of the branch station 3 is provided with blocking means 52, 53, 54 designed to prevent operation of the circuit breaker 51 when the coupling 5 is not provided with a coupling piece 25. The blocking means may, for instance, have a mechanical design, or a wholly or partly electrical or electronic design.

In this example, the system comprises a detector 52, which is arranged to detect whether a coupling piece 25 has been provided on the coupling 5 in a predetermined (desired) manner. The detector 52 may, for instance, be designed to detect the presence of a coupling piece (in the coupling 5), for instance utilizing optical, mechanical, or electrical detection means and/or in a different manner. In this example, the detector 52 can cooperate with the power-cutout switch 95 to control this switch 95. Control of the power-cutout switch may also be carried out in a different manner, which will be readily apparent to a skilled person.

The blocking means further comprise, for instance, a device 53, 54 which cooperates with the operating means 55, 56, 57 of the circuit breaker 51. In this example, this device 53, 54 is designed to block operating means 55, 56, 57 depending on the detection carried out by detector 52. In this example, the device comprises, for instance, an actuator 53 which makes a blocking element 54 engage locking system 55 to prevent operation of the locking system as long as the detector 52 detects no coupling piece 25. The actuator 53 can release locking system 55 automatically, by a suitable movement of the blocking element 54 when the detector 52 does detect a coupling piece 25. Control of such blocking means 52, 53, 54 may, for instance, be carried out by an (electronic) control Q suitable for this purpose.

As mentioned, the locking system 55, 56 may be arranged to operate the circuit breaker 51. In the non-limiting example, this operation can take place only after the locking system 55, 56 has been released by the blocking means 52, 53, 54, so when a coupling piece 25 of the second medium voltage line K2 is coupled to the branch station 3 in a suitable manner. In particular, the retaining body 56 is provided with a transmission part 57 to transmit movement of retaining body 57 to the bridge part 59 of the circuit breaker 51. Here, the bridge part 59 is provided with an electrically insulating wedge part 58, provided with a shear surface which transmission part 57 can engage; the configuration of wedge part 58 and transmission part 57 is such that a first translation movement of the transmission part 57 (with a coupling piece-locking movement of the retaining body 56) results in translation of the wedge part 58, such that the wedge part 58 moves the bridge part 59 attached thereto towards the voltage line 8. A reverse translation of wedge part 58 may, for instance, be carried out under the influence of spring means (not shown), or in a different manner.

Use

Use of the system shown in the Figures may comprise a method according to the invention. Here, one or more end users (in this case airplanes) P are coupled to one or more respective end user electricity providers 10, while the end user electricity providers 10 receive medium voltage and convert it to the above-mentioned low voltage (in this case with a desired frequency).

The electricity provider 10 is, for instance, coupled to a branch station 3 with a respective (at least partly unwound) second medium voltage line K2, utilizing the respective coupling piece. Here, the coupling piece 25 is connected to the coupling 5, such that the locking system 55, 56 is released by the blocking means 52, 53, 54. Then, the locking system can be operated to retain coupling piece 25 in the coupled position, which also results in operation of the circuit breaker 51, and then in operation of the power-cutout switch 95 (under the influence of the detector 52), so that the second medium voltage line K2 is also electrically connected to the voltage-carrying first branch line 8 (via output 28 and first connector part 25A). This results in the condition shown in FIG. 5, where the medium voltage supplied via a conductor of the first medium voltage line K1 reaches the second medium voltage line K2 via first branch line 8, fuse 4, closed power-cutout switch 95, closed circuit breaker 51 and output 28. In this condition, the neutral conductor of the second medium voltage line K2 is electrically coupled by the branch station 3 to the (locally grounded) neutral conductor N of the first medium voltage line K1, and thus grounded on itself.

During use, each end user P and respective end user electricity provider 10 may, for instance, be moved from a position away from each other towards each other in order to be intercoupled, and, in the position moved towards each other, may preferably be at a distance shorter than 100 m from each other, preferably shorter than 25 m and more in particular shorter than 10 m.

In particular, an end user electricity provider 10 may move towards an airplane P, for instance utilizing an abovementioned remote control B. Here, the end user electricity provider can unwind the respective medium voltage line K2.

The electricity provider 10 is, for instance, coupled to the end user P via the means intended and suitable for this (in this case a low voltage cable 11 and coupling part 12). The distance between electricity provider 10 and end user P may then be relatively short, for instance a distance of less than 50 m, in particular less than 10 m.

Preferably, the low voltage cable 11 can couple a local grounding through to the end user P, automatically, for instance via a neutral conductor. During coupling of the low voltage cable 11 to the transport means, then preferably, first, electrical contact is made between a grounded neutral conductor part of the cable 11 and the transport means P, and only then between a low voltage-carrying part of the cable 11 and the transport means P.

The electricity provider 10 provides low voltage to the transport means P, by converting medium voltage obtained via the second medium voltage line K2 to low voltage. Optionally, the end user electricity provider 10 may provide the end user P with a cooled or heated medium, for instance for the purpose of feeding a temperature conditioning system of the transport means.

After a desired electricity provision, for instance prior to leave of the end user P (i.e. leave from the end user location), the end user electricity provider 10 may, for instance, move away from the transport means P; in the process, medium voltage line K2 may be wound again.

According to a further elaboration, the medium voltage line K2 may carry voltage at least during winding and unwinding to provide the electricity provider with electricity.

In this manner, end users, for instance transport means, airplanes, or other end users, can be provided with electricity (comprising a particular voltage with a desired frequency) in a particularly efficient manner. In this manner, emergency power units of end users may be prevented from being activated, for instance during stopovers, which considerably reduces the local emission of undesired pollutants. The present system is particularly safe to use, and energy-saving.

It will be readily apparent to a skilled person that the invention is not limited to the exemplary embodiments. Various modifications are possible within the framework of the invention as set forth in the following claims. The term "a" may, for instance, mean only one, or a plurality.

Thus, for instance, different end user electricity providers 10 may be coupled to different branches 3, or to one and the same branch 3.

Further, a transport means may, for instance, be provided with low voltage by only one (external) end user electricity provider 10, or by two or more end user electricity providers 10 (for instance if the transport means is provided with several low voltage inputs).

End users may, for instance, comprise vehicles, airplanes or vessels. In particular, each end user is movable to a predetermined end user location, to temporarily reside at the end user location (to be stored there), to then leave the end user location. Further, the end users may comprise mobile fairground attraction apparatuses, caravans, trailers, market end users, conference stands, and other end users. Also with such end users, the present invention can obviate local nuisance of use of (diesel) generators.

According to a further elaboration, for instance, several second medium voltage lines K2 may run along one another over a particular distance, and may, for instance, be intercoupled with coupling means, for instance tie-wraps or belts.

Further, an end user electricity provider 10 may, for instance, be provided with multi-phase current (for instance three-phase current), by supplying different phases via different (separate) second medium voltage lines K2 to the end user electricity provider 10. In this case, the end user electricity provider may be arranged to convert the separately provided multi-phase medium voltage current to multi-phase low voltage.

The invention claimed is:

1. An electricity distribution system, arranged to provide low voltage to end users, located at end user locations, the system comprising:
    a first medium voltage line for providing medium voltage, wherein the first medium voltage line is provided with a number of branches; and
    a plurality of end user electricity providers associated with a respective end user locations, wherein each end user electricity provider is couplable to an end user located at the respective end user location, and is arranged to provide low voltage to the end user;
    wherein the end user electricity providers are each couplable to a respective branch of the first medium voltage line via a respective second medium voltage line to receive the medium voltage, and are arranged to convert the medium voltage to the low voltage to be provided to a respective end user,
    wherein the system includes a number of branch stations providing the number of branches,
    wherein at least one of the branches is provided with one or more manually operable detachable couplings, to couple one or more second medium voltage lines to the first medium voltage line,
    wherein the at least one branch station includes:
    a first branch line, provided with an output, coupled to a conductor of the first medium voltage line; and
    a second branch line, provided with an output, coupled to a neutral conductor of the first medium voltage line,
    wherein the first branch line is provided with a power-cutout switch, which is arranged to allow an electrical connection in the first branch line only after it has been determined that the second medium voltage line is coupled to the respective branch station in a desired manner, and wherein the respective branch station includes a detector to control the power-cutout switch.

2. The system according to claim 1, wherein the first and second medium voltage lines provide alternating current with a first frequency, wherein at least one of the end user electricity providers is arranged to provide an AC voltage with a second frequency to the respective end user, wherein the first frequency is lower than 100 Hz, wherein the second frequency is higher than 100 Hz.

3. The system according to claim 2, wherein the second frequency is in the range of 200-500 Hz.

4. The system according to claim 1, wherein each end user electricity provider includes one or more frequency converters configured to convert the alternating current of the first frequency to the alternating current of the second frequency.

5. The system according to 1, wherein the low voltage is a voltage lower than 1 kV.

6. The system according to claim 1, wherein said first medium voltage line operatively provides a voltage in the range of 1-50 kV.

7. The system according to claim 1, wherein the at least one end user electricity provider is provided with a cooling and/or heating device arranged to provide a cooling and/or heating medium to the respective end user.

8. The system according to claim 1, including a circuit breaker configured to interrupt an electrical connection between the first branch line and an output of the respective branch station if no medium voltage line is coupled to the branch station.

9. The system according to claim 8, wherein the power-cutout switch is configured to close the first branch line only after it has been determined that the circuit breaker is closed completely, wherein the power-cutout switch is controlled to automatically interrupt the first branch line as soon as the circuit breaker is or has been opened.

10. The system according to claim 8, wherein the operation of the circuit breaker depends on a medium voltage line locking system, wherein the configuration is such that, if the second medium voltage line is coupled to the branch station in a predetermined manner safe for bystanders, the circuit breaker can be operated to enable provision of medium voltage to the second medium voltage line, wherein in case the second medium voltage line is not coupled to the branch station in a particular manner, the circuit breaker automatically brings about interruption of voltage supply to the medium voltage output.

11. The system according to claim 1, wherein each second medium voltage line comprises a coupling piece which can cooperate with the manually operable detachable coupling, wherein the coupling piece includes a first connector part to receive the medium voltage from a respective output of the respective branch station when the coupling piece is retained by the detachable coupling, wherein the coupling piece comprises a neutral conductor coupling part to make electrical contact with the output of the second branch line.

12. The system according to claim 11, wherein the configuration of the coupling piece and the manually operable detachable coupling is such that, during coupling, first, electrical contact is made between their grounded neutral conductor parts and only then between the first connector part and voltage output.

13. The system according to claim 11, including a locking system to lock the coupling piece to the branch station.

14. The system according to claim 1, wherein the at least one said branch is provided with a safety device for protecting the second medium voltage line coupled thereto, wherein the safety device comprises a high-voltage fuse, which is arranged to interrupt current supply to the second medium voltage line under the influence of a short-circuit current with a threshold value of 400 Ampere or more.

15. The system according to claim 1, wherein the end users are vehicles, airplanes or vessels.

16. A method to provide low voltage to at least one end user using at least one respective end user electricity provider, wherein the at least one end user is located at an end user location, wherein the at least one end user is coupled to the at least one respective end user electricity provider, the method comprising the at least one respective end user electricity provider receiving medium voltage, converting the received medium voltage to low voltage, and providing the low voltage to the at least one end user, the method including: providing a first medium voltage line for providing the medium voltage to the at least one respective end user electricity provider, and providing a second medium voltage line for providing the medium voltage to a respective end user electricity provider, wherein the first medium voltage line is connected to a number of branch stations, the branch stations providing a number of branches to which the at least one end user electricity provider is couplable to at least one branch, wherein at least one of the branch stations is provided with: (a) one or more manually operable detachable couplings, to couple one or more second medium voltage lines to the respective branch station, (b) a first branch line, comprising an output, coupled to a conductor of the first medium voltage line and (c) a second branch line, comprising an output, coupled to a neutral conductor of the first medium voltage line;

wherein the second medium voltage line is manually coupled to the respective branch station, wherein the first branch line is provided with a power-cutout switch arranged to allow an electrical connection in the first branch line only after it has been determined that the second medium voltage line is coupled to the respective branch station in a desired manner, and wherein the respective branch station includes a detector to control the power-cutout switch.

17. The method according to claim 16, wherein both the medium voltage and low voltage comprise AC voltage, and wherein a frequency of the low voltage is higher than a frequency of the medium voltage.

18. The method according to claim 16, wherein the end users are airplanes, located at an airport.

19. The method according to claim 16, wherein the method further comprises:

coupling the one or more second medium voltage lines to the one or more manually operable detachable couplings of the respective branch station using a coupling piece that cooperates with its manually operable detachable coupling, wherein the coupling piece includes a first connector part to receive the medium voltage from a respective output of the respective branch station when the coupling piece is retained by the detachable coupling, wherein the coupling piece comprises a neutral conductor coupling part to make electrical contact with the output of the second branch line, and locking the coupling piece to the respective branch station using a locking system.

20. The method according to claim 19, wherein the coupling comprises: first making electrical contact between grounded neutral conductor parts of the coupling piece and the manually operable detachable coupling, and then, second, making electrical contact between the first connector part and the output.

21. An electricity distribution system, arranged to provide low voltage to end users, located at end user locations, the system comprising:
   a first medium voltage line for providing medium voltage, wherein the first medium voltage line is provided with a number of branches; and
   a plurality of end user electricity providers associated with a respective end user locations, wherein each end user electricity provider is couplable to an end user located at the respective end user location, and is arranged to provide low voltage to the end user;
   wherein the end user electricity providers are each couplable to a respective branch of the first medium voltage line via a respective second medium voltage line to receive the medium voltage, and are arranged to convert the medium voltage to the low voltage to be provided to a respective end user,
   wherein the system includes a number of branch stations providing the number of branches,
   wherein at least one of the branches is provided with one or more manually operable detachable couplings, to couple one or more second medium voltage lines to the first medium voltage line,
   wherein the at least one branch station includes:
   a first branch line, provided with an output, coupled to a conductor of the first medium voltage line; and
   a second branch line, provided with an output, coupled to a neutral conductor of the first medium voltage line,
   wherein each second medium voltage line comprises a coupling piece which cooperates with the one or more manually operable detachable couplings and a locking system to lock the coupling piece to the respective branch,
   wherein the coupling piece includes a first connector part to receive the medium voltage from a respective output of the respective branch station when the coupling piece is retained by the coupling, and wherein the coupling piece comprises a neutral conductor coupling part to make electrical contact with the output of the second branch line.

22. The system according to claim 21, wherein the first branch line is provided with a power-cutout switch arranged to allow an electrical connection in the first branch line only after a determination that the second medium voltage line is coupled to the respective branch station, and wherein the respective branch station includes a detector to control the power-cutout switch.

23. The system according to claim 22, further comprising a circuit breaker configured to interrupt an electrical connection between the first branch line and an output of the respective branch station based upon a determination that no medium voltage line is coupled to the branch station.

24. An electricity distribution system, arranged to provide low voltage to end users, located at end user locations, the system comprising:
   a first medium voltage line for providing medium voltage, wherein the first medium voltage line is provided with a number of branches; and
   a plurality of end user electricity providers associated with a respective end user locations, wherein each end user electricity provider is couplable to an end user located at the respective end user location, and is arranged to provide low voltage to the end user;
   wherein the end user electricity providers are each couplable to a respective branch of the first medium voltage line via a respective second medium voltage line to receive the medium voltage, and are arranged to convert the medium voltage to the low voltage to be provided to a respective end user,
   wherein the system includes a number of branch stations providing the number of branches,
   wherein at least one of the branches is provided with one or more manually operable detachable couplings, to couple one or more second medium voltage lines to the first medium voltage line,
   wherein the at least one branch station includes:
   a first branch line, provided with an output, coupled to a conductor of the first medium voltage line; and
   a second branch line, provided with an output, coupled to a neutral conductor of the first medium voltage line,
   wherein each second medium voltage line comprises a coupling piece which can cooperate with the manually operable detachable coupling, wherein the coupling piece includes a first connector part to receive the medium voltage from a respective output of the respective branch station when the coupling piece is retained by the detachable coupling, wherein the coupling piece comprises a neutral conductor coupling part to make electrical contact with the output of the second branch line.
   wherein the configuration of the coupling piece and the manually operable detachable coupling is such that, during coupling, first, electrical contact is made between their grounded neutral conductor parts and only then between the first connector part and voltage output.

* * * * *

UNITED STATES PATENT AND TRADEMARK OFFICE
CERTIFICATE OF CORRECTION

PATENT NO.         : 9,780,566 B2
APPLICATION NO.    : 14/738569
DATED              : October 3, 2017
INVENTOR(S)        : Martinus Johannes Maria Van Riet It is certified that error appears in the above-identified patent and that said Letters Patent is hereby corrected as shown below:

On the Title Page

Item (56) References Cited, FOREIGN PATENT DOCUMENTS:
Please correct the foreign reference as follows:
WO    WO 2007/0000016 A1 * 1/2007 ........................B65H 75/4402

Signed and Sealed this
Twentieth Day of February, 2018

Andrei Iancu
*Director of the United States Patent and Trademark Office*